United States Patent
Mugura et al.

(10) Patent No.: US 6,208,342 B1
(45) Date of Patent: *Mar. 27, 2001

(54) GRAPHICAL USER INTERFACE FOR ENABLING SELECTION OF A SELECTABLE GRAPHIC IMAGE

(75) Inventors: Kazuto Mugura, San Francisco, CA (US); Eduardo Sciammarella, New York, NY (US); Scott Kravitz, San Francisco, CA (US)

(73) Assignees: Sony Corporation (JP); Sony Electronics Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/483,877

(22) Filed: Jan. 18, 2000

Related U.S. Application Data

(63) Continuation of application No. 09/006,611, filed on Jan. 13, 1998, now abandoned.

(51) Int. Cl.[7] ............................................. G06F 3/00
(52) U.S. Cl. .......................... 345/339; 345/353; 345/355; 345/127
(58) Field of Search ................................. 345/352, 353, 345/355, 339, 341, 123, 127, 130

(56) References Cited

U.S. PATENT DOCUMENTS

| | | | |
|---|---|---|---|
| 5,283,560 | 2/1994 | Bartlett | 345/113 |
| 5,436,954 | 7/1995 | Nishiyama et al. | 455/566 |
| 5,450,560 | 9/1995 | Bridges et al. | 395/410 |
| 5,481,659 | 1/1996 | Nosaka et al. | 395/123 |
| 5,485,197 | 1/1996 | Hoarty | 348/7 |
| 5,555,354 | 9/1996 | Strasnick et al. | 385/127 |
| 5,557,413 | 9/1996 | Ebihara et al. | 358/296 |
| 5,600,779 | 2/1997 | Palmer et al. | 395/340 |
| 5,615,045 | 3/1997 | Takuma et al. | 359/456 |
| 5,677,708 | 10/1997 | Matthews, III et al. | 345/115 |
| 5,710,810 | 1/1998 | Tiilikainen | 379/355 |
| 5,737,396 | 4/1998 | Anderson et al. | 397/88 |
| 5,786,820 | 7/1998 | Robertson | 345/357 |
| 5,825,353 | 10/1998 | Will | 345/184 |
| 5,856,827 | 1/1999 | Sudo | 345/348 |
| 5,977,975 | * 11/1999 | Mugura et al. | 345/352 |

FOREIGN PATENT DOCUMENTS

| | | | |
|---|---|---|---|
| 0 767 418 A1 | 10/1996 | (EP) | G06F/3/033 |
| 0 792 056 A2 | 2/1997 | (EP) | H04M/1/72 |
| WO 95/25397 | 3/1995 | (WO) . | |

OTHER PUBLICATIONS

File selector from WordPerfect V. 6.1 for Windows, See screen dump.

* cited by examiner

Primary Examiner—Raymond J. Bayerl
Assistant Examiner—Sy D. Luu
(74) Attorney, Agent, or Firm—Fulwider Patton Lee & Utecht, LLP

(57) ABSTRACT

An instrument includes a display screen which includes a bitmap graphical user interface including an on-screen menu, and a control element which enables movement of the on-screen menu corresponding to movement of the control element, enables the user to manipulate and select graphic images for executing selected instrument functions. The instrument is adapted to enable the user to focus on and select a selectable graphic image from a plurality of graphic images in the on-screen menu.

2 Claims, 2 Drawing Sheets

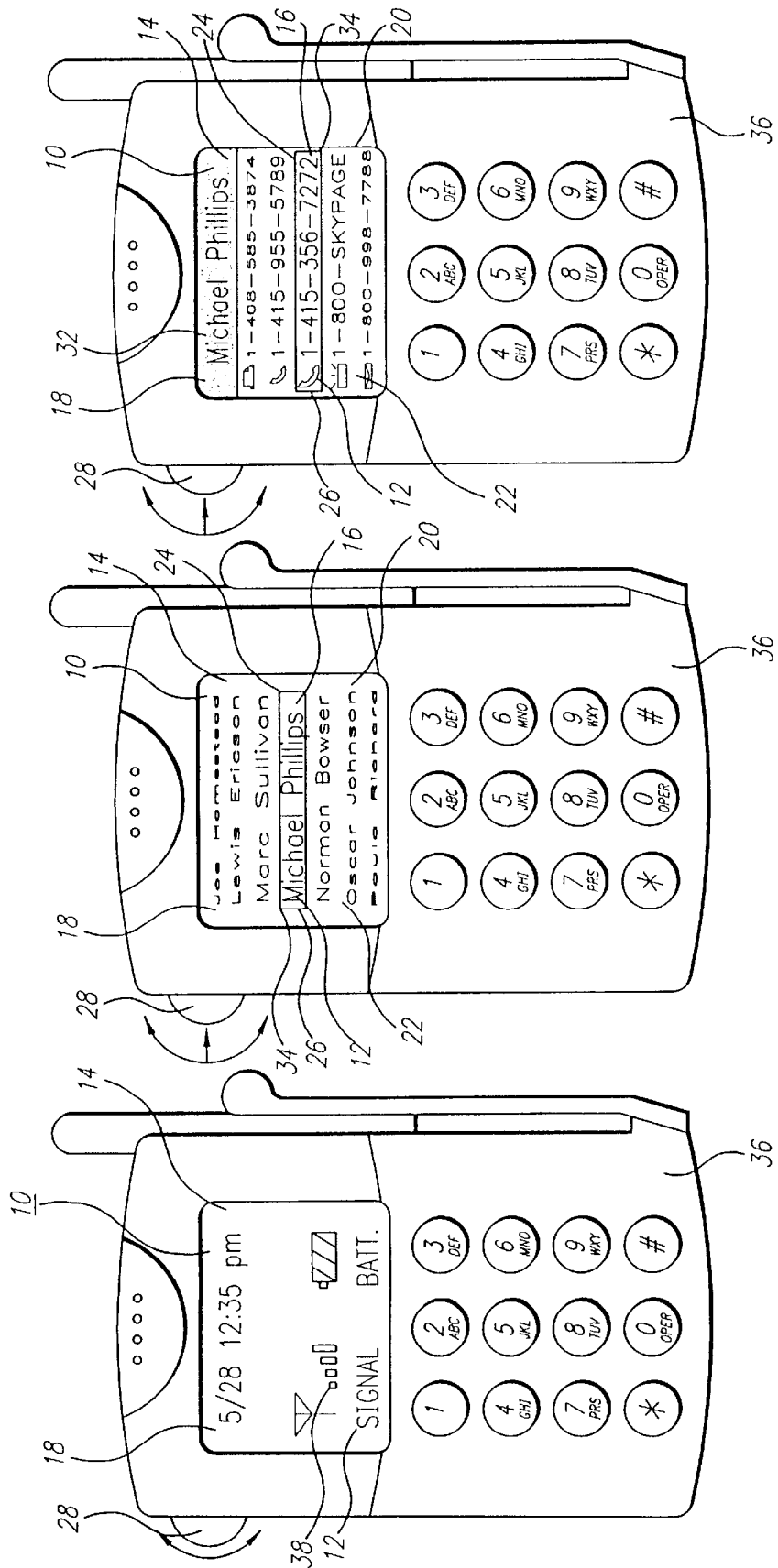

GRAPHICAL USER INTERFACE FOR ENABLING SELECTION OF A SELECTABLE GRAPHIC IMAGE

This application is a continuation of application Ser. No. 09/006,611 filed Jan. 13, 1998, which has been abandoned, entitled GRAPHIC USER INTERFACE FOR ENABLING SELECTION OF A SELECTABLE GRAPHIC IMAGE.

BACKGROUND OF THE INVENTION

The present invention relates generally to an interface for a display screen and, more particularly, to a graphical user interface which, with a control device, enables manipulation of graphic images on a display screen.

In an instrument which includes a display screen, an on-screen menu, and a control device, a user may interact with the on-screen menu by viewing the on-screen menu, deciding to select a menu item, and manipulating the control device to generate menu movement and to enable entry of the menu selection.

The instrument may comprise a hand-held wireless telephone which includes an on-screen menu displayed in a text text-based interface on a small liquid-crystal display screen, and a jog dial control device for scrolling through the menu and for entry of a menu selection and execution of an instrument function thereby.

The small liquid crystal display screen may enable viewing of a small number of lines of text, typically two lines. The menu may include a phone book feature in which names and phone numbers may be entered, for enabling browsing and selection of an entry whereupon the phone number selected is dialed. The instrument may also include other functions, such as pager reception, two-way pager sending, or short message sending such as e-mail. However, such an instrument may require frequent selection of menu entries and instrument functions by the user through the small text-based display screen which displays a very limited number of entries. The user may choose a single item from the items displayed, and may only need to focus on the single item to be selected, but the multiple items on display increase the difficulty in selecting the single item.

Therefore, there has been a need existing for a system which enables the user of an instrument to view and manipulate an intuitive interface in the display, and to view movement in the interface which corresponds to movement of the control device. The present invention fulfills these needs.

SUMMARY OF THE INVENTION

Briefly, and in general terms, the present invention provides an on-screen menu in an interactive graphical user interface, which provides for enabling manipulation of graphic images in a display screen.

The system enables manipulation of a plurality of graphic images on a display screen, to enable the user to focus on and select a selectable graphic image from a plurality of graphic images in the display screen, each graphic image being different from the other and movable into and out of position as the selectable graphic image. It includes a display screen. It further includes means for presenting the plurality of graphic images in the display screen, comprising a graphical user interface. It also includes means for enabling a graphic image to be a selectable graphic image. The system also includes means for enabling the user to differentiate between the selectable and other graphic images, other than by the differences between graphic images. It further includes means for enabling movement of the graphic images into and out of position as the selectable graphic image, and for enabling selection of the selectable graphic image.

One aspect of the present invention is that a system enables the user to view and manipulate graphic images in an on-screen menu in an intuitive graphical user interface in a display screen.

Another aspect of the present invention is that a system enables the user to view and manipulate graphic images, and focus on and select a selectable graphic image in an on-screen menu, while being able to view an array of graphic images in a graphical user interface in a display screen.

Other features and advantages of the invention will become apparent from following detailed description taken in conjunction with the accompanying drawings, which illustrate, by way of example, the features of the invention.

BRIEF DESCRIPTION OF THE DRAWINGS

FIG. 1 is an elevational view illustrating an initial display in an instrument which includes an on-screen menu for viewing, focusing on, manipulating, and selecting a selectable graphic image in accordance with the present invention;

FIG. 2 is an elevational view of another display in an instrument which includes an on-screen menu in accordance with the present invention;

FIG. 3 is an elevational view of a further display in an instrument which includes an on-screen menu in accordance with the present invention;

DETAILED DESCRIPTION OF THE PREFERRED EMBODIMENTS

Figure 4:
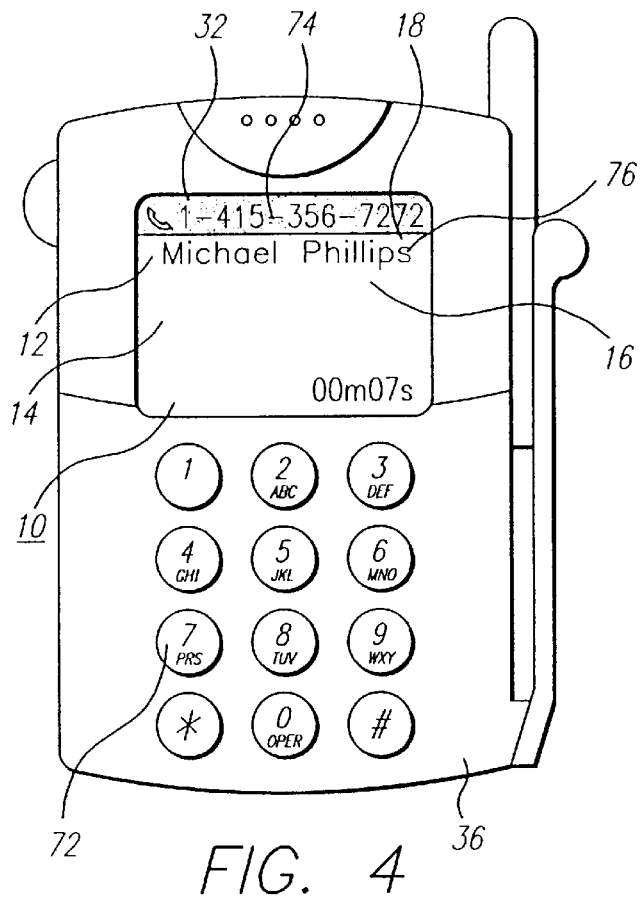
FIG. 4 is an elevational view of a still further display in an instrument which includes an on-screen menu in accordance with the present invention.
Figure 5:
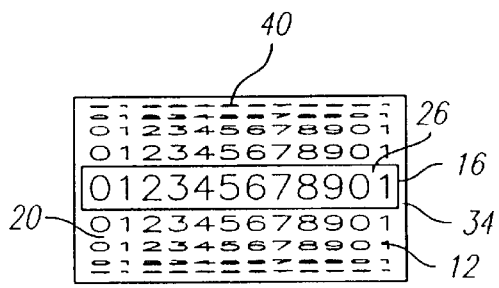
FIG. 5 is an elevational view of an on-screen menu in a display screen in accordance with the present invention.
Figure 6:
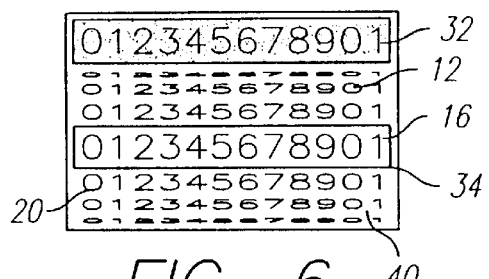
FIG. 6 is an elevational view of another on-screen in a display screen in accordance with the present invention.

Referring now to the drawings, there are shown preferred embodiments of a system 10 for enabling manipulation of a plurality of graphic images 12 on a display screen 14.

In a preferred embodiment as shown in FIGS. 1–6, system 10 is adapted to enable a user to focus on and select a selectable graphic image 16 from the plurality of graphic images 12 on display screen 14. In system 10, the plurality of graphic images 12 are each movable into and out of a position as a selectable graphic image 16. Each graphic image 12 is different from the other graphic images 12. Graphic images 12 may comprise alphabetical images, numerical images, and icons. A graphical user interface 18 which comprises a bitmap display includes the plurality of graphic images 12 therein, and presents an array 20 of the plurality of graphic images 12 in display screen 14. Graphical user interface 18 may comprise a menu 22 which includes the plurality of graphic images 12 and selectable graphic image 16 therein. Array 20 of graphic images 12 presented in display screen 14 may comprise at least five graphic images, and preferably comprise seven graphic images 12. Menu 22 is scrollable, appears to occupy three-dimensional space, and appears to be a rotatable wheel including a rounded wheel-like surface in a wheel metaphor. A cursor 24 enables a graphic image 12 to be positionable in a position 26 in graphical user interface 18 so as to be a selectable graphic image 16. A jog dial 28 is rotatable and pressable, to enable movement of the plurality of graphic images 12 into and out of position as selectable graphic image 16, and to enable selection of selectable graphic image 16 in display screen 14. Rotation of jog dial 28 results in corresponding rotation of graphic images 12 in display screen 14.

System 10 enables a user to differentiate between the plurality of graphic images 12 and selectable graphic image 16, and to focus on and select one of the plurality of graphic images 12 as selectable graphic image 16. For example, one of the plurality of graphic images 12 may appear as an enlarged image relative to the other graphic images 12, upon moving such graphic image 12 into position as selectable graphic image 16. The enlarged image enables the user to differentiate between selectable graphic image 16 and the other graphic images 12, other than by the differences between graphic images 12, and enables the user to focus on selectable graphic image 16. In the preferred embodiment, the font size of the graphic image 12 which has been moved into position as selectable graphic image 16 is greater than the other graphic images 12. The differentiating font size may comprise the height of the font, in that the height of the font of the graphic image 12 which has been moved into position as selectable graphic image 16 may be greater than the height of the fonts of graphic images 12 other than selectable graphic image 16. Alternatively, for example, menu 22 may include a color background for each graphic image 12 and selectable graphic image 16, with the color background for selectable graphic image 16 being different from the color background for the other graphic images 12, to enable the user to differentiate therebetween.

System 10 also enables the user to view array 20 of the plurality of graphic images 12 in display screen 14, so that the user may be aware of, focus on, and select one of array 20 of graphic images 12 as selectable graphic image 16, by rotation of menu 22 to move the selected graphic image 12 into position 26 as selectable graphic image 16. In the preferred embodiment, the font sizes of graphic images 12 other than selectable graphic image 16 decrease with increasing distance from selectable graphic image 16, enabling the user to view array 20 of graphic images 12 in display screen 14. The font size may comprise the height of the fonts of graphic images 12 other than selectable graphic image 16, which font size may decrease with increasing distance from selectable graphic image 16.

Display screen 14 preferably comprises a bitmap screen for presenting graphical user interface 18. It may comprise a liquid crystal display screen, and may comprise a color display screen. Selectable graphic image 16 is preferably positionable in substantially the center of display screen 14. Movement of one of the plurality of graphic images 12 out of position as selectable graphic image 16 moves such graphic image 12 to the next position which is adjacent to position 26 for selectable graphic image 16. Menu 22 includes a plurality of spaces 30, each of which includes a graphic image 12 therein. Menu 22 may present a different plurality of graphic images 12 and selectable graphic image 16 in each screen as shown in FIGS. 2–4. In the screen shown in FIG. 4, a header graphic image 32 is also presented.

Cursor 24 may preferably include an outline 34 which extends about selectable graphic image 16, or may be adapted to highlight selectable graphic image 16, as by flashing selectable graphic image 16. Position 26 of selectable graphic image 16 may preferably be in substantially the center of display screen 14.

Jog dial 28 may be rotatable such that rotation thereof results in corresponding rotation of the plurality of graphic images 12 in display screen 14, and may also be pressable to select the selectable graphic image 18. Jog dial 28 may preferably be located on the side of an instrument which may comprise a wireless telephone 36 in which a compact display screen 14 may be mounted, enabling manipulation of jog dial 28 with the thumb of the user, or may be located in the back of wireless telephone 36 enabling manipulation of jog dial 28 with the forefinger of the user.

Wireless telephone 36 is adapted to perform a plurality of functions which may include dialing a telephone number, paging, and sending a message. It includes graphic level indicators 38 for indicating for example the level of signal strength and battery charge, and may further include graphic images (not shown) for enabling direct access to several instrument functions. Also, the plurality of graphic images 12 and selectable graphic image 16 in a menu 22 each enable access to a function, either directly, or indirectly by enabling access to another menu 22 which enables access to the function. Wireless telephone 36 is adapted to be held by the user in one hand, and to enable manipulation of jog dial 26 with one finger.

In operation, for example, wireless telephone 36 may be held in one hand by the user, jog dial 28 may be manipulated by one finger of the user, and wireless telephone 36 may be activated by turning on a power switch (not shown). The power switch may activate display screen 14 which may comprise a bitmap screen including graphical user interface 18 in a liquid crystal display screen 14, to present for example the screen shown in FIG. 1, which may display the date and time of day and graphic level indicators 38 for indicating instrument levels.

Accessing the next screen as shown in FIG. 2 may present menu 22 in display screen 14, including graphic images 12 and selectable graphic image 16 in menu 22. Selectable graphic image 16 may be presented as the largest of the plurality of graphic images 12 in display screen 14, in that the height of the font of selectable graphic image 16 may be greater than the height of the fonts of graphic images 12 other than selectable graphic image 16, to enable the user to differentiate between selectable graphic image 16 and the other graphic images 12 so as to focus on selectable graphic image 16, as shown in FIGS. 2–6. Also, the height of the fonts of graphic images 12 may decrease with increasing distance from selectable graphic image 16, to enable the user to be aware of and focus on one of array 20 of graphic images 12 as selectable graphic image 16. Selection of selectable graphic image 16 is enabled by cursor 24 which may be positioned at position 26 in substantially the center of display screen 14 in menu 22, in which selectable graphic image 16 may be positioned.

Rotating jog dial 28 results in corresponding rotation of menu 22, which is scrollable and appears to be a three-dimensional rotatable wheel including a rounded wheel-like surface, so as to move a graphic image 12 which is in position 26 as selectable graphic image 16 out of position 26, and moves the next adjacent graphic image 12 into position as selectable graphic image 16. Pressing job dial 28 generates selection of selectable graphic image 16, enabling access to the function represented by selectable graphic image 16. For example, pressing jog dial 28 while in the screen shown in FIG. 2 wherein the "phonebook" is the selectable graphic image 16 enables access to the "phonebook" screen shown in FIG. 3. Next, pressing jog dial 28 while in the screen shown in FIG. 3 wherein "Michael Phillips" is the selectable graphic image 16 enables access to the screen shown in FIG. 4 which includes the "Michael Phillips" header graphic image 32. Then pressing jog dial 28 enables access to the dialer function of wireless telephone 36 to dial the telephone number which is selectable graphic image 16 in menu 22.

From the foregoing it will be appreciated that the system of the present invention provides advantages in enabling manipulation of a plurality of graphic images on a display screen. While particular forms of the invention have been illustrated and described, it will be apparent that various modifications can be made without departing from the spirit and scope of the invention. Accordingly, the invention is not to be limited, except as by the following claims.

What is claimed is:

1. A system for enabling manipulation of a plurality of graphic images on a display screen, to enable a user to focus on and select a selectable graphic image from a plurality of graphic images in the display screen, wherein the plurality of graphic images are each movable into and out of a position as the selectable graphic image, the system comprising:

a display screen;

means for presenting a plurality of graphic images in the display screen, wherein each graphic image is different from the other graphic images and the plurality of graphic images are each movable into and out of a position as the selectable graphic image, comprising a graphical user interface adapted to enable the user to differentiate between the graphic image positioned as the selectable graphic image and the graphic images other than the selectable graphic image in the display screen other than by the differences between the graphic images, including a bit map;

means for enabling each graphic image to change in size upon movement thereof in the graphical user interface bit map towards, into, and away from a position as a selectable graphic image, so as to increase in size as it moves towards and into the position as a selectable graphic image, to be largest in size in the position as the selectable graphic image, and to decrease in size as it moves out of and away from the position as a selectable graphic image, such that the selectable graphic image is the most visible, while other graphic images are visible to varying degrees in relation to the position thereof relative to the selectable position thereof;

means for enabling a graphic image to be a selectable graphic image, which graphic image is movable into the selectable position in the presenting means; and means for enabling movement of the plurality of graphic images into and out of the position as the selectable graphic image, and for enabling selection of the selectable graphic image in the display.

2. A method of enabling manipulation of a plurality of graphic images on a display screen, to enable a user to focus on and select a selectable graphic image from a plurality of graphic images in the display screen, wherein the plurality of graphic images are each movable into and out of a position as the selectable graphic image, in a system which includes a display screen, means for presenting a plurality of graphic images in the display screen, wherein each graphic image is different from the other graphic images and the plurality of graphic images are each movable into and out of a position as the selectable graphic image, comprising a graphical user interface adapted to enable the user to differentiate between the graphic image positioned as the selectable graphic image and the graphic images other than the selectable graphic image in the display screen other than by the differences between the graphic images, including a bit map means for enabling each graphic image to change in size upon movement thereof in the graphical user interface bit map towards, into, and away from a position as a selectable graphic image, so as to increase in size as it moves towards and into the position as a selectable graphic image, to be largest in size in the position as the selectable graphic image, and to decrease in size as it moves out of and away from the position as a selectable graphic image, such that the selectable graphic image is the most visible, while other graphic images are visible to varying degrees in relation to the position thereof relative to the selectable position thereof, means for enabling a graphic image to be a selectable graphic image, which graphic image is movable into the selectable position in the presenting means, and means for enabling movement of the plurality of graphic images into and out of the position as the selectable graphic image, and for enabling selection of the selectable graphic image in the display, the method comprising:

activating the display screen;

presenting the plurality of graphic images in the graphical user interface in the display, such that movement of a graphic image into position as the selectable graphic image enables the user to select the selectable graphic image, and such that each graphic image increases in size as it moves towards and into a position as a selectable graphic image, and each graphic image decreases in size as it moves out of and away from a position as a selectable graphic image;

moving the movement enabling means to move a graphic image into and out of position as the selectable graphic image; and activating the movement enabling means to select the selectable graphic image in the display.

* * * * *